(12) United States Patent
Chenard-Lemire et al.

(10) Patent No.: US 12,294,493 B2
(45) Date of Patent: May 6, 2025

(54) SYSTEM AND METHOD FOR DEVICE CONFIGURATION

(71) Applicant: GENETEC INC., Saint-Laurent (CA)

(72) Inventors: Christian Chenard-Lemire, Pointe-Claire (CA); Scott Melby, Lancaster, PA (US); Charles Desjardins, Laval (CA); Richard Doyle, Mount Airy, MD (US); Mortimer Hubin, Laval (CA)

(73) Assignee: GENETEC INC., Saint-Laurent (CA)

( * ) Notice: Subject to any disclaimer, the term of this patent is extended or adjusted under 35 U.S.C. 154(b) by 9 days.

(21) Appl. No.: 17/975,787

(22) Filed: Oct. 28, 2022

(65) Prior Publication Data
US 2024/0146606 A1 May 2, 2024

(51) Int. Cl.
H04L 41/084 (2022.01)
G06K 7/14 (2006.01)
H04L 41/08 (2022.01)

(52) U.S. Cl.
CPC .......... H04L 41/084 (2013.01); G06K 7/1417 (2013.01); H04L 41/0886 (2013.01)

(58) Field of Classification Search
CPC .............. H04L 41/084; H04L 41/0886; G06K 47/1417
See application file for complete search history.

(56) References Cited

U.S. PATENT DOCUMENTS 7,352,853 B1 4/2008 Shen et al.
8,532,095 B2 9/2013 Mammoliti et al.
10,191,457 B2 1/2019 Warrier
10,320,608 B2 6/2019 Gel
10,805,155 B1 10/2020 Le et al.
(Continued)

FOREIGN PATENT DOCUMENTS

EP 3668106 2/2022
KR 20070114586 12/2007

OTHER PUBLICATIONS

Carstens, "A Method for Automated Basic Engineering of Intelligent Electronic Devices", Dec. 13, 2011.*
(Continued)

Primary Examiner — Todd L Barker
(74) Attorney, Agent, or Firm — NORTON ROSE FULBRIGHT CANADA LLP

(57) ABSTRACT

A device configuration method for a vehicle in a fleet of vehicles comprises, at a computing device communicatively coupled to electronic devices provided in the vehicle, obtaining at least one template configuration file assigned to the computing device based on a user selection, the at least one template configuration file specific to the fleet of vehicles and comprising first configuration data indicative of a manner in which the computing device is to interface with the electronic devices, and second configuration data indicative of a desired setting for at least one configuration parameter of one or more electronic devices, automatically self-configuring for operation based on the first configuration data, and transmitting, at least in part, the second configuration data to the one or more electronic devices to cause the one or more electronic devices to adjust the at least one configuration parameter to the desired setting.

25 Claims, 7 Drawing Sheets

(56) References Cited

U.S. PATENT DOCUMENTS

| | | | |
|---|---|---|---|
| 10,855,533 B2 | 12/2020 | Zhang et al. | |
| 10,887,447 B2 | 1/2021 | Jakobsson et al. | |
| 11,025,723 B2 | 6/2021 | Fortna et al. | |
| 11,109,204 B2 | 8/2021 | Kruse et al. | |
| 11,394,612 B2 | 7/2022 | Puranic et al. | |
| 2007/0261116 A1* | 11/2007 | Prafullchandra | H04L 51/52 |
| | | | 726/22 |
| 2009/0037367 A1* | 2/2009 | Wein | G06F 9/5061 |
| 2014/0309806 A1* | 10/2014 | Ricci | G05D 23/1917 |
| | | | 701/1 |
| 2016/0366233 A1 | 12/2016 | Le et al. | |
| 2017/0033986 A1 | 2/2017 | Anderson et al. | |
| 2017/0316696 A1 | 11/2017 | Bartel | |
| 2019/0363899 A1* | 11/2019 | Christian | H04L 65/611 |
| 2020/0043250 A1 | 2/2020 | Maier et al. | |
| 2020/0221296 A1 | 7/2020 | Jiang et al. | |
| 2021/0075671 A1 | 3/2021 | Li et al. | |
| 2021/0108618 A1* | 4/2021 | Brody | F03D 17/00 |
| 2021/0258392 A1 | 8/2021 | Tiwari et al. | |
| 2021/0306214 A1 | 9/2021 | Lane et al. | |
| 2022/0206868 A1 | 6/2022 | Dreyer et al. | |
| 2022/0210017 A1 | 6/2022 | Katukam et al. | |
| 2022/0210235 A1 | 6/2022 | Katukam et al. | |

OTHER PUBLICATIONS

Matesanz et al., "Demand Driven Data Acquisition for Large Scale Fleets" Oct. 29, 2021.*

* cited by examiner

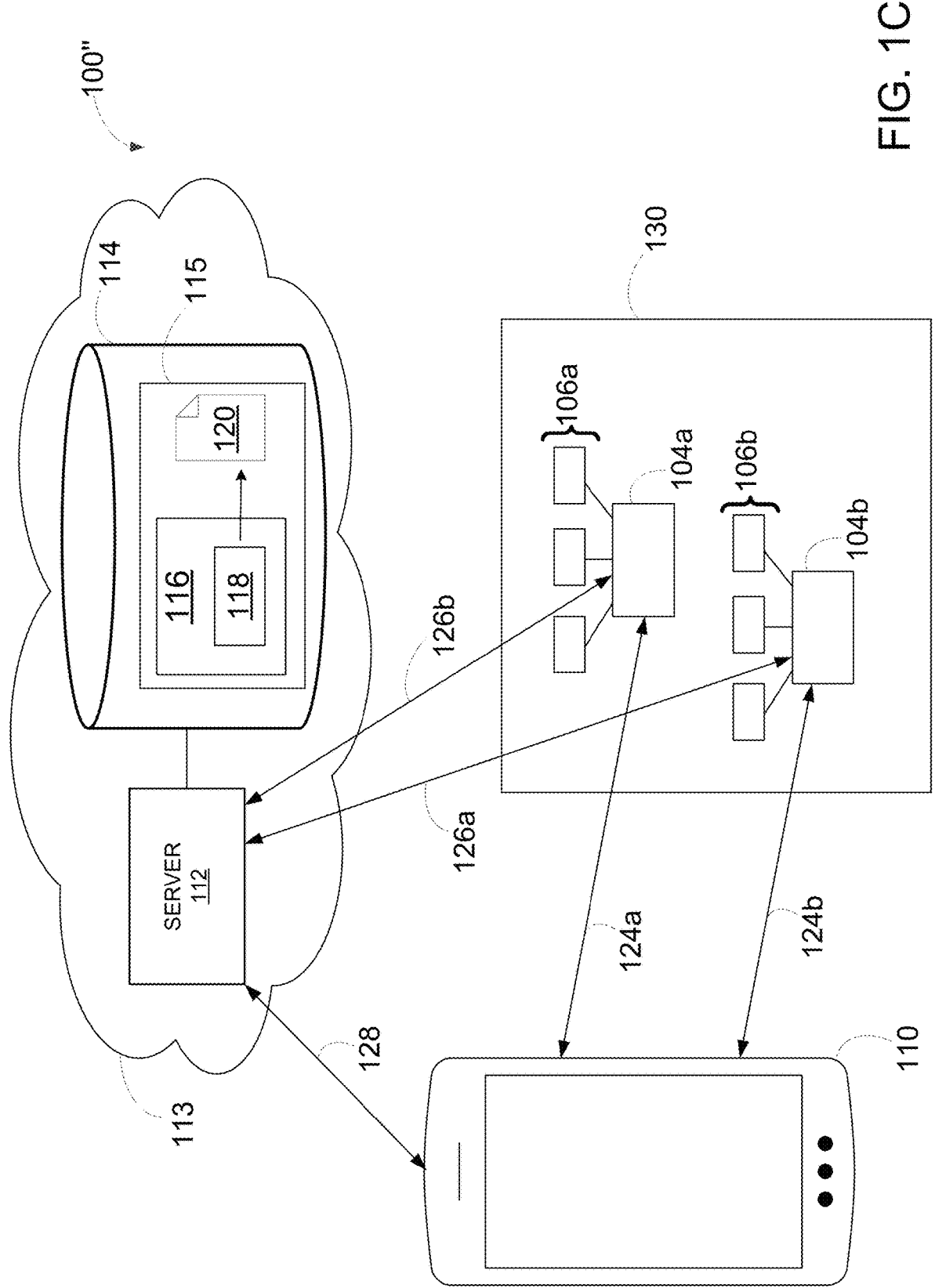

SYSTEM AND METHOD FOR DEVICE CONFIGURATION

FIELD

The improvements generally relate to the field of device configuration, and more particularly to template-based device configuration.

INTRODUCTION OR BACKGROUND

In some existing systems, such as vehicle systems, multiple electronic devices having a standardized topology are typically used to record data indicative of system operation. The recorded data is transmitted to a computing device where the data can be locally stored for subsequent use. The recorded data can also be offloaded to a server for storage and processing, such as when the vehicle returns to the storage bay at the end of a route. However, the configuring of the computing device and of the electronic devices often proves to be a cumbersome process. For example, when numerous vehicles in a fleet of vehicles are to be configured with the same electronic devices, the configuration process can be time consuming, as it needs to be repeated for each vehicle in the fleet. In addition, the computing device and the electronic devices generally use open architecture principles, which prevents the devices from being pre-configured in factory as the actual configuration will depend on the use cases, hardware and software configuration specific for each customer/end user. As a result, the devices need to be configured once connected to the system, making the setup of the system time consuming and error prone. A similar issue arises when a change in configuration is required because it may prove difficult to make changes in the short connection windows usually available for the devices. This may in turn result in a lack of configuration uniformity.

Therefore, there is room for improvement.

SUMMARY

The present disclosure describes, among other things, an edge device configuration method for a vehicle in a fleet of vehicles. The edge device can be connected to Internet protocol (IP) video cameras and other electronic devices installed in the vehicle, such as a bus, which is part of the fleet of vehicles being configured in the same way. This edge device can be used to receive video data from the cameras in the vehicle, temporally store it locally, and provide it to a cloud server (e.g., when connected to 5G, when connected to Wi-Fi at the end of a route, etc.) that provides at least a cloud-based video management system (VMS) or facilitates the interface with an on-premise server providing a VMS. A user can easily enroll the edge device with the mobile device by providing to the cloud server a device identifier of the edge device (e.g., from scanning a QR code on the edge device that has the device identifier encoded therein). The user can quickly configure the edge device, as the cloud server can provide to the mobile device the option to select at least one predefined configuration template for the edge device for that fleet of vehicles that the user can select and which the mobile device transmits the selection to the cloud server. The edge device when powered on can connect to the cloud server and obtain the configuration file for itself and the cameras and other connected electronic devices. Not only can the edge device automatically configure itself, it can also configure the cameras and other electronic devices connected thereto.

In accordance with one aspect, there is provided a device configuration method for a vehicle in a fleet of vehicles. The method comprises, at a computing device communicatively coupled to a plurality of electronic devices provided in the vehicle, obtaining at least one template configuration file assigned to the computing device based on a user selection, the at least one template configuration file specific to the fleet of vehicles and comprising first configuration data and second configuration data, the first configuration data indicative of a manner in which the computing device is to interface with the plurality of electronic devices, and the second configuration data indicative of a desired setting for at least one configuration parameter of one or more of the plurality of electronic devices, automatically self-configuring for operation based on the first configuration data, and transmitting, at least in part, the second configuration data to the one or more of the plurality electronic devices to cause the one or more of the plurality of electronic devices to adjust the at least one configuration parameter to the desired setting.

In accordance with another aspect, there is provided a device configuration method for a vehicle in a fleet of vehicles. The method comprises, at a mobile device separate from the vehicle, obtaining an identifier associated with a computing device communicatively coupled to a plurality of electronic devices provided in the vehicle, obtaining a list of template configuration files for the computing device, rendering the list of template configuration files on an output device associated with the mobile device, receiving, in response to the rendering, a user selection of at least one template configuration file among the list of template configuration files, the at least one template configuration file specific to the fleet of vehicles and comprising first configuration data and second configuration data, the first configuration data indicative of a manner in which the computing device is to interface with the plurality of electronic devices, and the second configuration data indicative of a desired setting for at least one configuration parameter of one or more of the plurality of electronic devices, and transmitting the user selection of the at least one template configuration file to a server remote from the vehicle to cause the computing device to obtain the at least one template configuration file from the server, automatically self-configure for operation based on the first configuration data, and transmit, at least in part, the second configuration data to the one or more of the plurality electronic devices to cause the one or more of the plurality of electronic devices to adjust the at least one configuration parameter to the desired setting.

In accordance with another aspect, there is provided a computing device for use in device configuration for a vehicle of a fleet of vehicles. The computing device comprises a memory, a processor, and an application stored in the memory and executable by the processor for obtaining at least one template configuration file assigned to the computing device based on a user selection, the at least one template configuration file specific to the fleet of vehicles and comprising first configuration data and second configuration data, the first configuration data indicative of a manner in which the computing device is to interface with a plurality of electronic devices provided in the vehicle and communicatively coupled to the computing device, and the second configuration data indicative of a desired setting for at least one configuration parameter of one or more of the plurality of electronic devices, automatically self-configuring for operation based on the first configuration data, and transmitting, at least in part, the second configuration data to the one or more of the plurality electronic devices to cause the one or more electronic of the plurality of devices to adjust the at least one configuration parameter to the desired setting.

In accordance with another aspect, there is provided a mobile device for use in device configuration for a vehicle in a fleet of vehicles. The mobile device comprises a memory, a processor, and an application stored in the memory and executable by the processor for obtaining an identifier associated with a computing device communicatively coupled to a plurality of electronic devices provided in the vehicle, obtaining a list of template configuration files for the computing device, rendering the list of template configuration files on an output device associated with the mobile device, receiving, in response to the rendering, a user selection of at least one template configuration file among the list of template configuration files, the at least one template configuration file specific to the fleet of vehicles and comprising first configuration data and second configuration data, the first configuration data indicative of a manner in which the computing device is to interface with the plurality of electronic devices, and the second configuration data indicative of a desired setting for at least one configuration parameter of one or more of the plurality of electronic devices, and transmitting the user selection of the at least one template configuration file to a server remote from the vehicle to cause the computing device to obtain the at least one template configuration file from the server, automatically self-configure for operation based on the first configuration data, and transmit, at least in part, the second configuration data to the one or more of the plurality electronic devices to cause the one or more of the plurality of electronic devices to adjust the at least one configuration parameter to the desired setting.

In accordance with another aspect, there is provided a non-transitory computer-readable medium having stored thereon program instructions executable by a processor for obtaining at least one template configuration file assigned to a computing device based on a user selection, the at least one template configuration file specific to the fleet of vehicles and comprising first configuration data and second configuration data, the first configuration data indicative of a manner in which the computing device is to interface with a plurality of electronic devices provided in a vehicle of the fleet of vehicles and communicatively coupled to the computing device, and the second configuration data indicative of a desired setting for at least one configuration parameter of one or more of the plurality of electronic devices, automatically self-configuring for operation based on the first configuration data, and transmitting, at least in part, the second configuration data to the one or more of the plurality electronic devices to cause the one or more electronic of the plurality of devices to adjust the at least one configuration parameter to the desired setting.

In accordance with another aspect, there is provided a non-transitory computer-readable medium having stored thereon program instructions executable by a processor for obtaining an identifier associated with a computing device communicatively coupled to a plurality of electronic devices provided in a vehicle of a fleet of vehicles, obtaining a list of template configuration files for the computing device, rendering the list of template configuration files on an output device associated with a mobile device, receiving, in response to the rendering, a user selection of at least one template configuration file among the list of template configuration files, the at least one template configuration file specific to the fleet of vehicles and comprising first configuration data and second configuration data, the first configuration data indicative of a manner in which the computing device is to interface with the plurality of electronic devices, and the second configuration data indicative of a desired setting for at least one configuration parameter of one or more of the plurality of electronic devices, and transmitting the user selection of the at least one template configuration file to a server remote from the vehicle to cause the computing device to obtain the at least one template configuration file from the server, automatically self-configure for operation based on the first configuration data, and transmit, at least in part, the second configuration data to the one or more of the plurality electronic devices to cause the one or more of the plurality of electronic devices to adjust the at least one configuration parameter to the desired setting.

Many further features and combinations thereof concerning embodiments described herein will appear to those skilled in the art following a reading of the instant disclosure.

DESCRIPTION OF THE FIGURES

In the figures,

FIG. 10 is a schematic diagram illustrating a system for device configuration, in accordance with yet another illustrative embodiment;

It will be noticed that throughout the appended drawings, like features are identified by like reference numerals.

DETAILED DESCRIPTION

Described herein are systems and methods for device configuration. In one embodiment, the systems and methods described herein may be used to configure one or more devices provided in a vehicle of a fleet of vehicles. As used herein, the term "fleet", when used in relation to vehicles, refers to a group of vehicles that are owned (or leased) and operated by an entity, the vehicles in the fleet being configured with the same devices. Any suitable entity such as, a business (e.g., car rental company, taxicab company, etc.), a public utility company, a public bus company, a police department, a government agency, or any other organization, may operate the fleet of vehicles. The processes related to the fleet of vehicles may be managed (e.g., using a fleet management system) by one or more fleet managers affiliated with the entity. The fleet of vehicles may be used for any suitable purpose including, but not limited to, transportation, delivery, manufacturing, and construction. Any type of motor vehicles including, but not limited to, cars, vans, trucks, buses, trailers, earth-moving machinery, forklifts, specialist equipment (e.g., mobile construction machinery), aircraft, planes, helicopters, aviation machinery, military vehicles, and ships, and rail cars may thus apply. It should however be understood that the systems and methods described herein may be applied to environments other than vehicle environments. The systems and methods described herein may indeed apply to any environment or system provided with a plurality of devices having a standardized topology that require configuration. For example, other suitable environments including, but not limited to, buildings, commercial spaces, retail branches, unmanned, remote installations, and the like may apply.

Figure 1A:
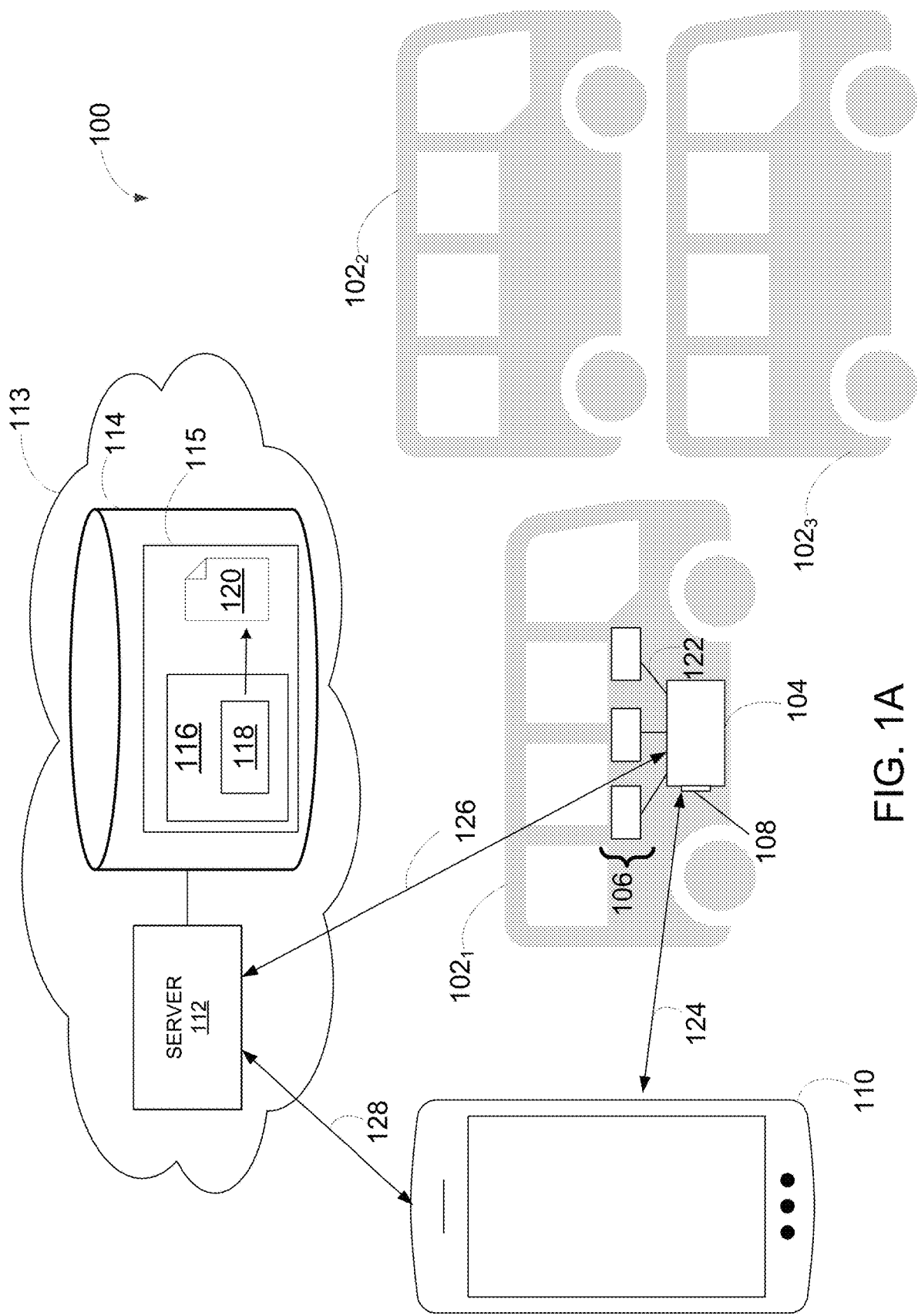
FIG. 1A is a schematic diagram illustrating a system for device configuration, in accordance with an illustrative embodiment.

FIG. 1A illustrates an example of a system 100 for device configuration in a vehicle $102_1$ of a fleet of vehicles $102_1$, $102_2$, $102_3$, in accordance with one embodiment. While the system 100 is illustrated as comprising a fleet of three (3) vehicles $102_1$, $102_2$, $102_3$, it should be understood that this is for sake of clarity and that the fleet may comprise any suitable number of vehicles other than three (3).

The system 100 may comprise a wide variety of different network technologies and protocols. As will be described further below, communication between components of the system 100 may occur across wired, wireless, or a combination of wired and wireless networks. As used herein, the term "wired" refers to the transfer of information (or data) between two points that are electrically connected (e.g., by an electrical conductor). When reference is made herein to a wired communication link, connection or path, it should be understood that any suitable technology may be used to establish the wired communication link including, but not limited to, RS-232, USB, USB 2.0, USB 3.0, USB-C, Thunderbolt™, Ethernet, and the like. As used herein, the term "wireless" refers to the transfer of information (or data) between two points that are not connected by an electrical conductor. When reference is made herein to a wireless communication link, connection or path, it should be understood that any suitable wireless technology or communication protocol may be used to establish the wireless communication link including, but not limited to, radio waves (e.g., VHF radio, HF radio, LoRaWAN), Near-Field Communication (NFC), Bluetooth™, Zigbee™, Ultra-wideband (UWB), mobile broadband, wireless spread spectrum such as Wi-Fi (Standardized as IEEE 802.11a, b, g, n, ac, ax), cellular data service, satellite communication (SATCOM), SATA, e-SATA, and the like. Furthermore, in addition to the devices that will be described below with reference to FIG. 1A, the system 100 may include any number of devices such as routers, modems, bridges, hubs, switches, and/or repeaters, among other possibilities.

As illustrated in FIG. 1A, the system 100 comprises a computing device 104 connected to one or more electronic devices 106 (three (3) of which are illustrated in FIG. 1A for sake of clarity) provided in the vehicle $102_1$. In some embodiments, the computing device 104 comprises computer-readable indicia 108. The system 100 further comprises a mobile device 110 and a data processing device (also referred to herein as a "server") 112 remote from the vehicle $102_1$ and the computing device 104. Although a single server 112 is illustrated and described herein, it should be understood that, in some embodiments, there may be several servers as in 112. For instance, in a distributed architecture comprising a bank of servers as in 112, each server 112 may be dedicated to a subset of the electronic device(s) 106. Each server 112 may be implemented in redundant copies or may have redundant storage to ensure data integrity in case of failure.

In one embodiment, the server 112 is provided as part of a cloud-based infrastructure 113 and may therefore be referred to as a "cloud server" or a "cloud computing server". The server 112 is configured to run part of the workload of one or more components of the system 100 in the cloud. In particular, the server 112 may provide any suitable service(s) or function(s) (e.g., cloud computing service(s)) related to management of the system 100 including, but not limited to, data processing, cloud archiving or storage of data, fleet maintenance, vehicle monitoring, driver management, asset and/or cargo management, passenger information, or other form of processing and/or management related to data received at the server 112. The server 112 may comprise one or more virtual processors (e.g. created with a Microsoft™ Azure™ cloud platform or any other suitable platform) configured to process data upon receipt thereof and cause the cloud computing service(s) to be provided.

The server 112 has associated therewith storage media 114 which may be one or more external database(s), one or more external systems, for example, having one or more databases, that are accessible via Application Programming Interface (API) calls, and/or one or more local databases that are part of the server 112. When the server 112 is provided as part of a cloud-based infrastructure, the storage media 114 may be referred to as "cloud-based storage media". The storage media 114 has stored therein a customer account 115. As used herein, the term "customer account" refers to an account associated with a user and/or organization upon registration of the user and/or organization with the system 100. A given user may be associated with multiple customer accounts as in 115. The customer account 115 may be used to uniquely identify the user and/or organization with the system 100 and may allow the server 112 to provide the user and/or organization with any service(s) (e.g., device configuration services) related to the management of the system 100. The server 112 could provide one or more cloud-based services for a respective customer account 115 and store data associated with the respective customer account 115, such that the data and services of a particular customer account 115 are segregated from the other customer accounts and are only accessible to the particular customer account 115. Therefore, each customer account 115 may be referred to as a "tenant". The customer account 115 comprises a device list 116, which lists the device(s) (e.g., the computing device 104) associated with the customer account 115 in the manner described further below. The device list 116 comprises at least one computing device identifier 118. As used herein, the term "identifier" refers to data that uniquely identifies a given device with other devices or system components. The identifier may comprise a serial number or any other suitable data. The device list 116 may be a database, or any other suitable mechanism for grouping data, that comprises at least one computing device identifier 118. The addition of a given computing device identifier 118 into the device list 116 may be referred to as enrollment, which is further described herein.

The customer account 115 also comprises one or more template configuration files 120. The template configuration files 120 are associated with the device list 116, as they may be used configure the one or more computing devices 104 in the device list 116. In one embodiment, the first (i.e. initial) template configuration file 120 may be created when a user configures the first vehicle in the fleet. In particular, when configuring the first vehicle, the user may proceed with configuring the computing device 104 and the plurality of electronic devices 106 in any desirable manner. This results in generation of the first template configuration file 120, which is then saved in the customer account 115 for future use.

Each template configuration file 120 (including the first template configuration file and any subsequent template configuration files) comprises first configuration data indicative of a manner in which the computing device 104 is to interface with the plurality of electronic devices 106, and second configuration data indicative of a desired setting for at least one configuration parameter of one or more of the plurality of electronic devices 106. Each vehicle $102_1$, $102_2$, or $102_3$ in the fleet of vehicles has a same template configuration file 120 associated therewith in order to ensure that all the electronic devices 106 in the vehicle $102_1$, $102_2$, or $102_3$ are configured in the same manner. In some embodiments, a same organization may manage more than one fleet (e.g., of vehicles) and the different fleets may be assigned different template configuration files. For example, the systems and methods described herein may be applied to a first fleet of 40 feet buses and a second fleet of 60 feet buses. In this case, a first template configuration file would be assigned to the 40 feet buses in the first fleet and a second template configuration file would be assigned to the 60 feet buses in the second fleet, the first and the second template configuration files being part of the customer account 115 stored in the storage media 114.

The computing device 104 can connect to each electronic device 106 via a communication link 122, optionally, to the mobile device 110 via a communication link 124, and to the server 112 via a communication link 126. The mobile device 110 is connected to the server 112 via a communication link 128. The server 112 may indeed have a known address (e.g., IP address) used for all devices within the system 100 that may connect to the server 112. For example, in one embodiment, the mobile device 110 and the electronic device(s) 106 may be configured at manufacture with the address of the server 112 pre-configured in the firmware. The address of the server 112 may alternatively be provided separately (e.g., in the user manual of the server 112 or on the website of a company providing the server 112) and may be provided as an input (e.g., as an input field in a web page presented on the mobile device 110 when connected to the computing device 104).

Figure 1B:
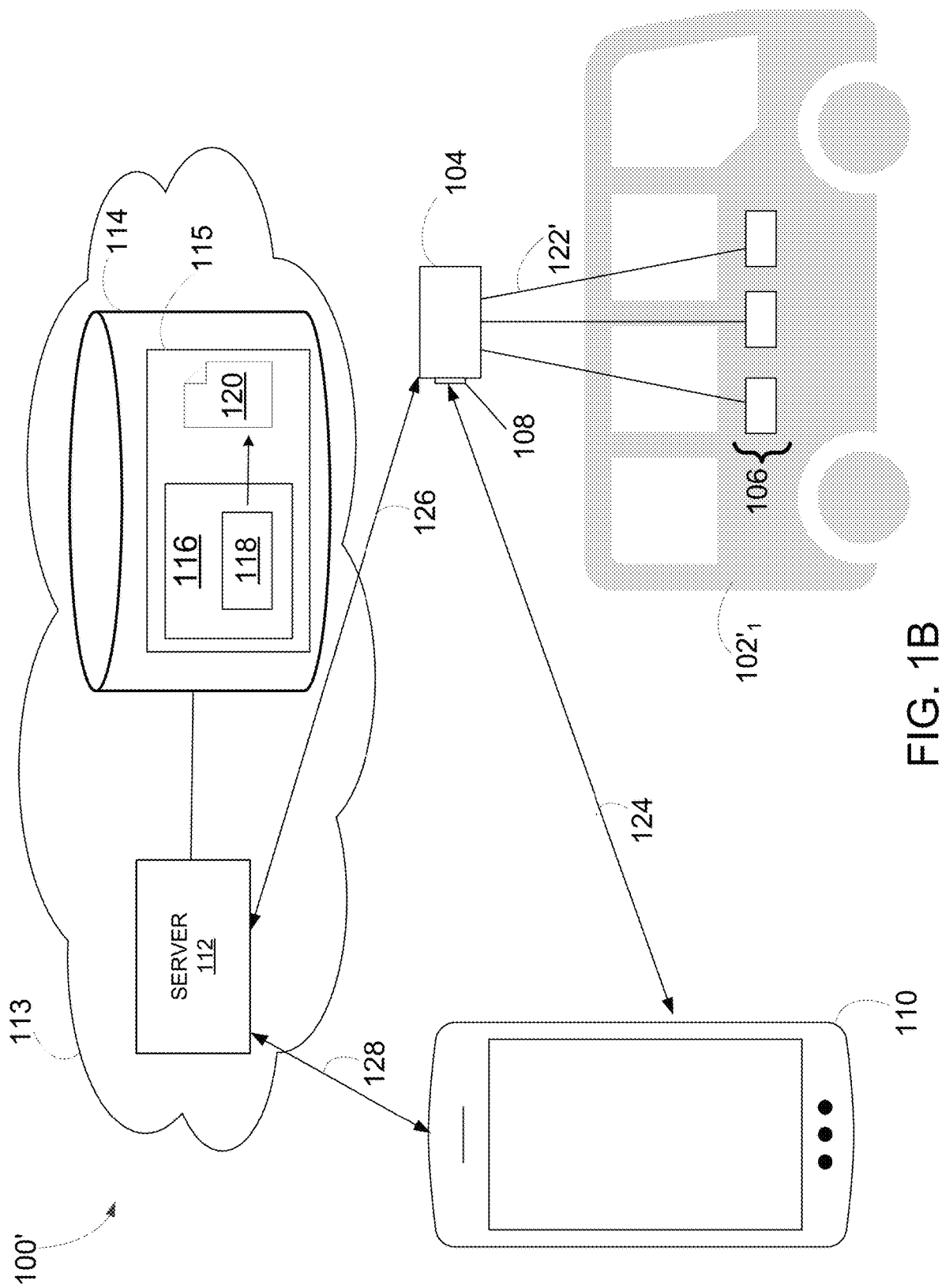
FIG. 1B is a schematic diagram illustrating a system for device configuration, in accordance with another illustrative embodiment.

The computing device 104 may be any device configured to provide a connection (and allow communication and data flow) between components having different network protocol technologies. In particular, the computing device 104 connects the devices provided in the vehicle $102_1$ (or other suitable environment), namely the electronic device(s) 106, and the server 112. The computing device 104 may act as bridge and/or gateway type device to connect electronic devices at the edge of a network with the server 112. The computing device 104 may therefore be referred to as an "edge device". The computing device 104 may comprise antenna(s), transmitter(s), receiver(s), transceiver(s), processor(s), and/or any other suitable components (not shown) for communication with the various components of the system 100. For example, the computing device 104 may comprise or be connected to wireless connection components, such as a Wi-Fi or 5G card, a cellular router, or a wireless modem or router. In some embodiments, the computing device 104 may be provided in the vehicle $102_1$ (as shown in FIG. 1A). In other embodiments, the computing device 104 may be provided externally. This is shown in FIG. 1B, which illustrates a system 100' in which the computing device 104 is positioned outside of a vehicle $102'_1$ of a fleet of vehicles and is communicatively coupled, via a communication link 122' which can be wired or wireless, to the electronic device(s) 106 installed in the vehicle $102'_1$. For example, the computing device 104 may be placed on a workbench located outside of the vehicle $102'_1$ and may be wirelessly connected to the electronic devices already installed in the vehicle $102'_1$ during installation, configuration and/or testing.

In addition, in yet other embodiments, more than one computing device as in 104 may be provided. FIG. 10 illustrates a system 100" comprising a first computing device 104a communicatively coupled to first electronic devices 106a, and a second computing device 104b communicatively coupled to second electronic devices 106b. The first electronic devices 106a and the second electronic devices 106 may comprise electronic devices of the same type or of different types. The first computing device 104a is communicatively coupled, optionally, to the mobile device 110 via a communication link 124a and to the server 112 via a communication link 126a, while the second computing device 104b is communicatively coupled, optionally, to the mobile device 110 via a communication link 124b and to the server 112 via a communication link 126b. The first computing device 104a and the second computing device 104b may operate concurrently, e.g. to transmit data acquired from the electronic devices 106a, 106b to the server 112. Although not illustrated in FIG. 10, the first computing device 104a and the second computing device 104b may, in some embodiments, be communicatively coupled to one another. For example, in a proxied architecture, the first computing device 104a may use the second computing device 104b as a proxy (or intermediary) through which the first computing device 104a may connect to other components of the system.

As previously noted, it should be understood that the systems and methods described herein may apply to environments other than vehicle fleet environments. FIG. 10 further illustrates the system 100' in which the computing devices 104a, 104b, and the electronic device(s) 106a, 106b are provided in such an environment 130.

In one embodiment, the computing device 104 has an identifier associated therewith. The identifier may be encoded (using any suitable technique) in computer-readable indicia 108 affixed to the computing device 104. In one embodiment, the indicia 108 is provided as a computer-readable label comprising a two-dimensional matrix code, such as provided by International Standard ISO/IEC 24778, 16022, or 18004. In some embodiments, the indicia 108 is provided as a label comprising Quick Response (QR) code or a data matrix code. It should however be understood that, in other embodiments, the indicia 108 is provided as a label comprising a one-dimensional linear barcode, such as provided by International Standard ISO/IEC 15417, 15420, 16388, or 16390. In yet other embodiments, the indicia 108 is provided as a radio-frequency identifier (RFID) tag.

The computing device 104 is communicatively coupled to each electronic device 106 using any suitable communication link 122, which may be wired or wireless. The electronic device(s) 106 are illustratively installed in the vehicle $102_1$. The installation may be permanent (e.g., using cables, adapters, connectors, harnesses, or the like) or temporary (e.g., using a temporary mount). The electronic device(s) 106 may comprise antenna(s), transmitter(s), receiver(s), transceiver(s), processor(s), and/or any other suitable components (not shown) for communication (e.g., with the computing device 104). The electronic device(s) 106 are configured to acquire data (referred to herein as "device data") from the vehicle $102_1$, and the device data may be acquired while the vehicle $102_1$ is in motion (e.g., on the road) or stationary (e.g., stored in a garage or parking lot).

In one embodiment, the electronic device(s) 106 comprise one or more digital video cameras (e.g., pan, tilt, and zoom or PTZ cameras, a fixed camera, etc.) disposed within the vehicle $102_1$. The digital video cameras comprise an image sensor that detects and conveys information used to produce images frames. In operation, the video cameras may be configured to generate media streams, which may include video data (e.g., image frames, meta-data, compressed video data, and/or uncompressed video data) and/or audio data, all referred to herein as "media stream data". Such video cameras may comprise Internet Protocol (IP) cameras configured to send media stream data via a network (not shown) they are placed in, which may, in this case, comprise an IP network. For example, video cameras may be configured to monitor the environment surrounding the vehicle $102_1$, which may be used to alert drivers about blind-spots, objects blocking the way, dangerously driven vehicles, or pedestrians crossing the road. The video cameras may also be configured to monitor the driver's condition in real-time and alert in case of distraction or drowsiness. The video cameras may also be configured to monitor passengers on the vehicle.

The electronic device(s) 106 may also (or alternatively) comprise radars, audio microphones, video and/or audio encoders connected to analog device(s) or appliance(s), access card readers, access control devices, door locks, sensors, and the like. For example, the electronic device(s) 106 may comprise one or more sensors including, but not limited to, speed sensor(s), accelerometer(s), torque sensor(s), fuel sensor(s), temperature sensor(s), vehicle brake or signal sensor(s), vibration sensor(s), position (e.g., Global Positioning System or GPS) sensor(s), motion detector(s), and smoke or other gas detector(s), configured to collect measurements (referred to herein as "measurement data") that may include, but is not limited to, speed, acceleration, torque, fuel level, temperature, position, and motion. For example, the measurement data collected by the sensors may be used to detect when to change the oil or the brake pads of the vehicle $102_1$. The sensors may also be used to monitor the temperature of the vehicle's cargo (e.g., to maintain perishable items such as medication or food items at a desired temperature). The media stream data, the measurement data, and any other data generated by the electronic device(s) 106 is collectively referred to herein as "device data". When the systems and methods described herein are used for device configuration in a non-vehicle environment, the electronic device(s) 106 may comprise any suitable device including, but not limited to, access control devices, heating, ventilation, and air conditioning (HVAC) systems, intercoms, automated teller machines (ATMs), cash registers, and Internet of Things (IoT) devices. Other embodiments may apply.

In addition to being communicatively coupled to the electronic device(s) 106, the computing device 104, in some embodiments, is communicatively coupled to the mobile device 110 via a communication link 124. In one embodiment, the communication link 124 is wireless. The mobile device 110 is separate from (i.e. not installed in) the vehicle $102_1$ and may, in some embodiments, be operated by a user while the user is outside of the vehicle $102_1$. In other embodiments, the mobile device 110 may be operated while the user is inside the vehicle $102_1$. Although reference is made herein to a single mobile device 110, it should be understood that the system 100 may comprise more than one such mobile device 110. The mobile device 110 may be any suitable portable or handled communication device including, but not limited to, a smartphone, a portable computer, and a tablet. The mobile device 110 may comprise antenna(s), transmitter(s), receiver(s), transceiver(s), processor(s), and/or any other suitable components (not shown) for communication (e.g., with the computing device 104 or any other component of the system 100). In some embodiments, the mobile device 110 is remote from the computing device 104 and the vehicle 102, such that the user configuring the computing device 104 is not physically present to the computing device 104 when providing the device identifier to the server 112 to associate the template configuration files 120 to the computing device 104.

In some embodiments, the mobile device 110 is configured to read the indicia 108 affixed to the computing device 104 in order to obtain the information encoded in the indicia 108, namely the identifier associated with the computing device 104. As previously described, in some embodiments, the indicia 108 may be provided as a computer-readable label comprising a barcode, a two-dimensional matrix code, or a QR code. The mobile device 110 may thus comprise, or be connected to, any suitable optical scanner configured to read the label and obtain the identifier encoded in the indicia 108. For example, the mobile device 110 may comprise a camera for capturing one or more images of the indicia 108 to obtain the identifier. The mobile device 110 may be further configured to process the image(s) of the indicia 108 in order to extract the identifier therefrom.

In yet other embodiments, the indicia 108 is provided as an RFID tag which may be any suitable tag including, but not limited to, a passive tag having no on-board battery and configured to use the radio energy transmitted by an RFID reader, an active tag having an on-board battery and configured to periodically transmit a signal, a battery-assisted passive tag having an on-board battery and configured to transmit a signal when in the presence of an RFID reader, a read-only tag, and a read-write tag. The mobile device 110 may thus comprise, or be connected to, any suitable RFID reader including, but not limited to, a Passive Reader Active Tag (PRAT) configured to receive radio signals from active tags, an Active Reader Passive Tag (ARPT) configured to transmit interrogator signals and receive replies from passive tags, and an Active Reader Active Tag (ARAT) configured to transmit interrogator signals and receive radio signals from active tags.

In other embodiments, no indicia 108 is provided on the computing device 104 and the mobile device 110 may be configured to connect to the computing device 104 via the communication link 124 in order to obtain the identifier. For example, the computing device 104 may store the identifier in a memory, database, or any other suitable storage means (not shown) accessible thereto. The mobile device 104 may then access, via the communication link 124, the memory, database, or other storage means to retrieve the identifier therefrom. For instance, the mobile device 110 may retrieve the identifier from the computing device 104 using a wireless communication protocol such as Bluetooth™, NFC, or the like. In other embodiments, the identifier associated with the computing device 104 is entered manually by a user, via any suitable input device(s) (not shown) associated with (e.g., integral or connected to) the mobile device 110. Such input device(s) may comprise a keypad, a touchscreen, or the like. For example, the identifier associated with the computing device 104 may be provided on a label attached to the computing device 104. By way of another example, the identifier associated with the computing device 104 may be obtained from a user manual or other documentation provided with the computing device 104.

The mobile device 110 may optionally to set an initial configuration of the computing device 104 over the communication link 124. This may, for example, apply where the computing device 104 is installed in a static IP network and it becomes desirable to configure network settings on the computing device 104 to allow the latter to connect to the server 112.

As shown in FIG. 1A, the computing device 104 and the mobile device 110 are further communicatively coupled to the server 112 via the communication link 126 and the communication link 128, respectively. In one embodiment, the communication links 126, 128 are wireless. The mobile device 110 is configured to transmit the identifier of the computing device 104, once obtained, to the server 112 via communication link 128. The server 112 then processes the received data to provide suitable fleet management service(s) for the system 100.

Figure 2:
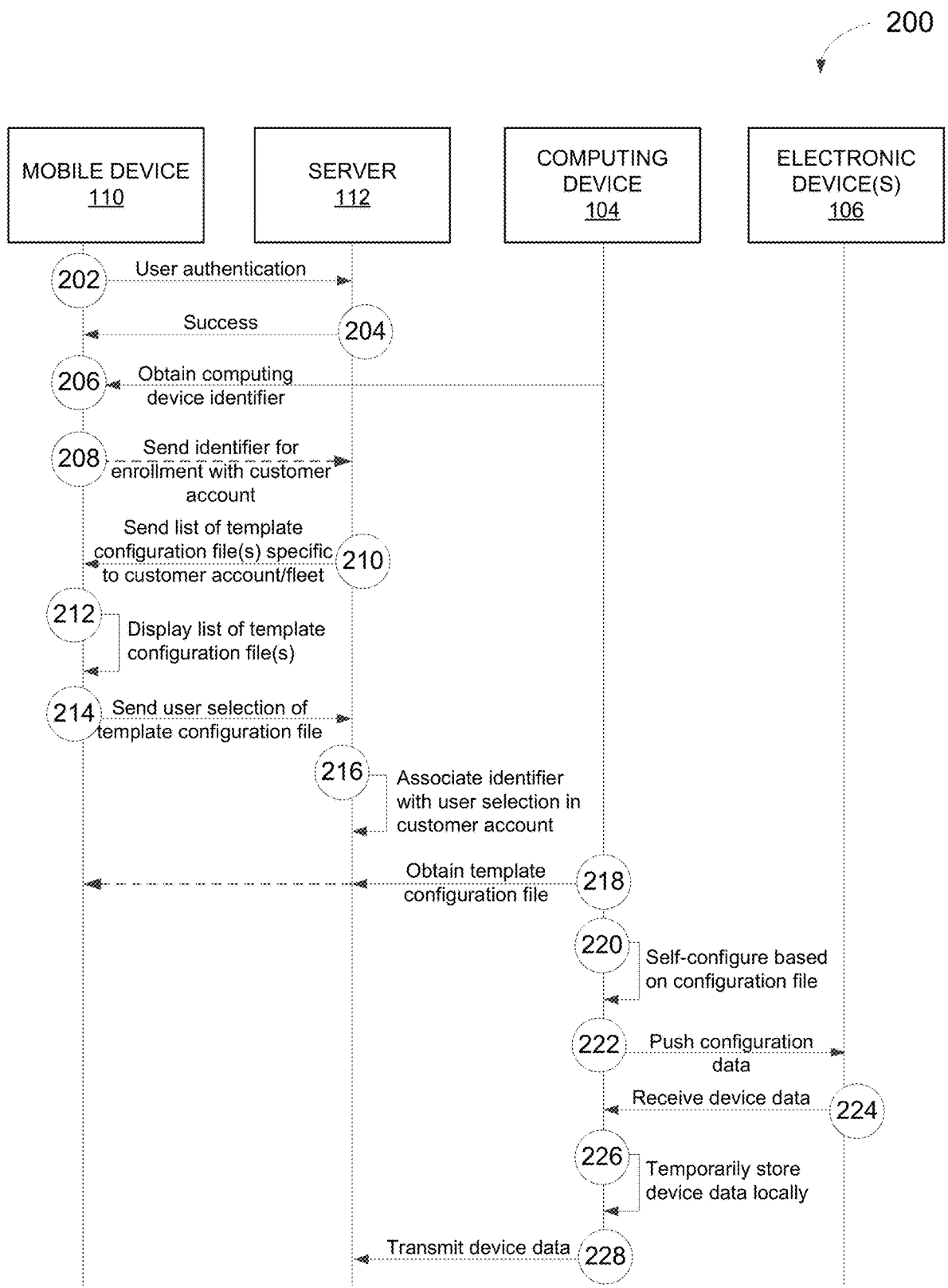
FIG. 2, a flow diagram showing interactions between components of the system of FIG. 1A, in accordance with an illustrative embodiment.

Referring now to FIG. 2, a flow diagram 200 showing interactions between components of the system 100 of FIG. 1A will now be described, in accordance with one embodiment. The flow diagram 200 illustrates interactions between the mobile device 110, the server 112, the computing device 104, and the electronic device(s) 106. In the illustrated example, the mobile device 110 begins by authenticating the user with the server 112 (interaction 202). For this purpose, the user may launch on their mobile device 110 a web browser or an application (e.g., a web application, a stand-alone application, etc.) used for configuration of the computing device 104 and of the electronic device(s) 106. Upon the launch of the web browser or application, an authentication web page comprising a log on screen may be displayed at the mobile device 110. The user may then enter authentication data (e.g., a username and password) into the log on screen to establish communication with the server 112 and log into their customer account (reference 115 in FIG. 1A). The authentication data is transmitted from the mobile device 110 to the server 112 where it is received. Upon verification of the authentication data (e.g. against a database of approved usernames and passwords), the server 112 may then authenticate the user and the connection with the mobile device 110 and provide to the mobile device 110 an indication of success of the authentication (interaction 204). The indication may be provided in the form of a message presented on the mobile device 110. In the event that the authentication fails, a corresponding indication would be output on the mobile device 110 and the configuration procedure would be brought to a stop.

Following successful authentication of the user, the mobile device 110 may proceed with obtaining the identifier of the computing device 104 (interaction 206). As described herein above, this may, in one embodiment, be achieved by using the mobile device 110 to read the computer-readable indicia 108 provided on the computing device 104. Alternatively, the identifier (e.g., retrieved from any suitable storage means) may be retrieved from the computing device 104 using a wireless communication protocol and/or entered by the user manually, using any suitable input means (e.g., keypad, touchscreen, etc.) associated with the mobile device 110. Once obtained, the identifier may be sent to the server 112 for enrollment with the customer account 115 associated with the user (interaction 208). As used herein, the terms "enrol" and "enrollment", when used in relation to a device, refer to the fact that a user is taking ownership of the device (e.g., by scanning or otherwise reading the computer-readable indicia provided thereon, and then providing the obtained identifier to the server to have it associated with their customer account). The device may be offline or powered off at the time of enrollment. It should however be understood that the interaction 208 may be optional since, in some embodiments, the identifier of the computing device 104 may be associated with the customer account 115 stored at the server 112 before delivery of the computing device 104 to a customer.

Upon receiving the identifier of the computing device 104 from the mobile device 110, the server 112 may proceed with enrollment of the computing device 104 by identifying the customer account 115 associated with the user of the mobile device 110 and by associating the computing device 104 (whose identifier has been received) with the customer account 115, thereby adding the computing device 104 to the device list (reference 116) associated with the customer account 115. Alternatively, the server 112 may confirm that the identifier of the computing device 104 has already been provisioned to the customer account 115 (e.g., before delivery of the computing device 104). The server 112 may send to the mobile device 110 a list of one or more template configuration files specific to the customer account 115 and to the fleet (interaction 210). The mobile device 110 may in turn, via the web browser or application, display the list of template configuration files with an option for the user to select at least one template configuration file from the list (interaction 212) for use by the computing device 104 to proceed with the configuration procedure. For example, if the customer has a first fleet of 40 feet buses and a second fleet of 60 feet buses, the list of template configuration files may comprise a first template configuration for the first fleet and a second template configuration for the second fleet, which the user can select depending on which bus they are currently configuring. It should be understood that the mobile device 110 may alternatively provide the user with the option to select at least one default configuration. The user may then make a selection of at least one template configuration file for the computing device 104 via the input means associated with the mobile device 110. The user selection specifies the electronic device(s) 106 the computing device 104 is to configure and parameters for configuring these electronic device(s) 106. The mobile device 110 then sends the user selection to the server 112 (interaction 214).

The server 112, upon receipt of the user selection, associates, in the customer account 115, the identifier of the computing device 104 with the user selection of the at least one template configuration file to allow the computing device 104 to obtain the at least one template configuration file selected by the user (interaction 216). The computing device 104 then communicates with the server 112 to obtain the at least one selected template configuration file that has been assigned to the computing device 104 at the server 112, based on the user selection (interaction 218). The computing device 104 may therefore obtain the at least one selected template configuration file in response to a use-initiated command (e.g., entered via the mobile device 110). In one embodiment, the computing device 104 obtains its template configuration file from the server 112 subsequent to the computing device 104 provisioning. As used herein, the terms "provision" and "provisioning", when used in relation to a device, refer to the fact that the device powers on and connects to the server 112 for the first time. In other embodiments, the user may push, via their mobile device 110, the template configuration file to the computing device 104 when selecting the configuration for the computing device 104 at interaction 214.

In one embodiment, the computing device 104 is configured to obtain the selected configuration once enrolled with the customer account 115. In the event that the computing device 104 is not yet enrolled with the customer account 115, the computing device 104 periodically connects to the network location it should reach out to (i.e. the server 112) to determine whether enrollment has been completed. Once the server 112 confirms that the computing device 104 has been enrolled, the computing device 104 can obtain the template configuration file (interaction 218). In the event that the computing device 104 has not yet been assigned a configuration after the server 112 confirms successful enrollment of the computing device 104 with the customer account 115, the computing device 104 may periodically connect to the server 112 to determine whether a configuration has been assigned. Once the server 112 confirms that a configuration has been assigned to the computing device 104, the computing device 104 obtains the template configuration file (e.g., pulls the template configuration file from the server 112). In some embodiments, the computing device 104 is configured to periodically communicate with the server 112 to monitor configuration changes for the computing device 104 and/or the electronic device(s) 106, and to retrieve any new configuration from the server 112 subsequent to detecting one or more configuration changes. This may occur, for example, when changes are made to a vehicle type configuration and the template configuration files are updated at the server 112. The server 112 can maintain a record of each computing device 104 and its current version of the configuration file that it is using, such as in the device list 116, and when a new version is available, the server 112 can flag a configuration change with a version so when the computing device 104 checks for a new configuration version it only downloads the new configuration file if there is a new version available.

The computing device 104 subsequently configures itself (i.e. self-configures) based on the obtained template configuration file (i.e. based on the first configuration data) (interaction 220). Such self-configuration may comprise identifying which ones of the electronic device(s) 106 the computing device 104 is connected to (or should connect to) and determining the manner in which the computing device 104 is to interface with these electronic device(s) 106 in order to receive data therefrom. The template configuration file may also include, for example in the first configuration data, network parameters, parameters for the connection to the server, applications that need to be downloaded and deployed on the computing device 104 and the parameters of these applications, logical and spatial mapping of various devices and inputs into human-readable formats, action rules (such as when to bookmark video), application log parameters, a listing of the electronic device(s) 106 to connect thereto, current and/or new login credentials (e.g., a current username and password and/or a new username and password, etc.) for one or more of the electronic device 106 and/or API key(s) for one or more of the electronic devices 106. Some of the aforementioned, may be included in the second configuration data, depending on practical implementations. The self-configurating may include using the network parameters to connect to one or more of the electronic device 106, using the network parameters to connect to the server 112 and/or another server providing VMS services, downloading one or more applications specified in the template configuration file and installing them on the computing device 104 and/or one or more of the other electronic device 106, configuring the installed applications based on the parameters provided in the template configuration file, converting the logical and spatial mapping of various devices and inputs into human readable formats, setting up rules that are to be executed according to the provided action rules, configuring logging of operations and/or data of the computing device 104 and/or one or more of the electronic device 106 based on the application log parameters, connecting to one or more of the electronic devices using the login credentials, and/or interfacing with one or more of the electronic devices 106 with the API key(s).

In some embodiments, the server 112 may maintain the configuration files in the form of one or more documents (or other records) that stores device information include metadata, configurations and/or conditions for the computing device 104 and/or electronic device(s). The document(s) (or record(s)) maintained at the server 112 for a given computing device 104 and its associated electronic device(s) 106 may replicate the state of the computing device 104 and/or electronic device(s). For example, the computing device 104 and each applicable electronic device 106 may each have a respective document. By way of another example, one document may be used for the computing device 104 and the electronic device(s) 106. The one or more documents may be a key-value document. For example, the documents may be in JSON, XML or any other suitable format. In some embodiments, the one or more documents may be implemented by device twins of Microsoft™ Azure™.

When the computing device 104 connects to the server 112, the computing device 104 receives the configuration file stored at the server 112. The fields in the configuration file (e.g., the document(s) and/or record(s)) may be extracted by the computing device 104 and to deserialize the configuration parts of the file that relate to the configuring of the computing device 104, such as to obtain the first configuration data. This extracted and deserialized configuration data (e.g., the first configuration data) can then be provided to one or more local daemons running on the computing device 104 that are responsible for applying the configuration data (e.g., one daemon can handle network configuration, another daemon can handle application deployment, etc.).

Once the computing device 104 has configured itself, the computing device 104 pushes, based on the template configuration file obtained from the server 112, the second configuration data to at least some of the electronic device(s) 106 connected to it (interaction 222). The second configuration data is transmitted, at least in part, to one or more of the electronic devices 106. In some embodiments, the second configuration data is pushed to all electronic devices 106 connected to the computing device 104. In other embodiments, some of the electronic device(s) 106 may not be configurable and the second configuration data is pushed to a subset of the electronic device(s) 106 that are configurable. In some embodiments, the configuration of the electronic device(s) 106 may vary such that it may be desirable to derive a configuration package for each electronic device 106 that the computing device 104 transmits data to. For this purpose, the computing device 104 may be configured to derive from the second configuration data different configurations for different electronic devices 106. In some embodiments, the fields in the configuration file (e.g., the document(s) and/or record(s)) may be extracted by the computing device 104 and to deserialize the configuration parts of the file that relate to the configuring of the electronic device(s) 106, such as to obtain the second configuration data. This extracted and deserialized configuration data (e.g., the second configuration data) can then be used to configure the electronic device(s) 106. For example, different fields in the configuration file may apply to different ones of the electronic devices 106. Accordingly, the second configuration data may comprise respective device-specific configuration data for each one of one or more of the electronic devices 106. In some embodiments, the configuring of one or more of the electronic devices 106 may be done via an application program interface (API) of a particular electronic device 106. For example, the computing device 104 may submit an API request that includes the configuration instructions to a given electronic device 106. The API request can include the second configuration data, the part of the second configuration data that is applicable to that particular electronic device 106 (e.g., the device-specific configuration data), or configuration instructions derived from the second configuration data applicable to that particular electronic device 106. The second configuration data may comprise the API request that are to be made by the computing device 106. In some embodiments, the configuring of one or more of the electronic devices 106 may be done by authenticating (e.g., by using the login credentials such as a username password) with a particular electronic device 106 (e.g., a video camera) and then setting one or more parameters of the particular electronic device 106. The second configuration data and/or first configuration data may comprise the login credentials and/or the parameters.

In one embodiment, the electronic device(s) 106 have one or more configuration parameters associated therewith and are caused, upon receipt of the second configuration data from the computing device 104, to configure themselves by adjusting the one or more configuration parameters to a desired setting. The configuration parameters correspond to any suitable operating parameter of the electronic device(s) 106. For example, where the electronic device(s) 106 comprise video cameras, the configuration parameters include, but are not limited to, a frame rate, an image quality, an image resolution, at least one network setting, a location update frequency, login credentials (e.g., username and password) associated with the video cameras, video analytics activation (e.g., enabling or disabling one or more of: facial recognition, crowd detection, people tracking, motion tracking, object tracking, people counting, left/removed object detection, etc.), activation of sound and/or PTZ presets for a field of view of the PTZ camera. For example, one or more cameras may be configured to enable people counting to count the number of people of the bus. Other embodiments may apply. The electronic device(s) 106, once configured, transmit their generated device data to the computing device 104, where it is received (interaction 224). The computing device 104 may, upon receipt of the device data, temporarily store the device data locally (e.g., in local storage media accessible to the computing device 104) (interaction 226). For example, the computing device 104 and one or more of the video cameras may be configured such that the video cameras capture image frames at a first image quality and/or frame rate, which is stored to local storage as a first media stream, and the computing device 104 provides to the server 112 in real-time, via a wireless connection (e.g., 5G), image frames from the first media stream, which may be at a second image quality and/or frame rate that is lower than the first image quality and/or frame rate, and then the first media stream can be transmitted to the server 112 over another connection (e.g., Wi-Fi) at a later time, such as when the vehicle returns to a storage bay at the end of a route. By way of another example, the computing device 104 may connect to one or more video cameras using current login credentials assigned to a given video camera (e.g., default login credentials) and update the login credentials with new login credentials, along with setting any of the parameters of the video camera.

The computing device 104 may then transmit the device data received from the electronic device(s) 106 to the server 112 for subsequent storage and/or processing (interaction 228). The device data is transmitted by the computing device 104 in accordance with its configuration. The template configuration file obtained at the computing device 104 may indeed specify the manner in which (and the moment at which) the device data is to be uploaded to the server 112. For example, the first configuration data may indicate that the computing device 104 is to transmit the device data to the server 112 only at the end of the day, when the computing device 104 is connected to Wi-Fi, or the like. The device data may also be stored locally (interaction 226) for a given period of time, which may correspond to a period of time during which a connection between the computing device 104 and the server 112 is lost. The computing device 104 may then transmit the device data to the server 112 after the connection is restored. In other embodiments, the computing device 104 may transmit the device data to the server 112 when the vehicle $102_1$ returns to the garage at the end of its route and connects to Wi-Fi. Other embodiments may apply.

In some embodiments, any changes made to the template configuration file at the server 112 may result in those changes being sent not only to the computing device 104 and/or the electronic device(s) 106, but to all computing devices and/or electronic devices associated with that template configuration file, for example, to update all vehicles in the fleet. In some embodiments, any changes made to a particular computing device 104 and/or particular electronic device 106, resulting in changes to the configuration file local to the particular electronic device 106, may be transmitted to the server 112 to update the template configuration file at the server 112, which may also result in those changes propagating to the other computing devices and/or electronic devices associated with that template configuration file.

Figure 3:
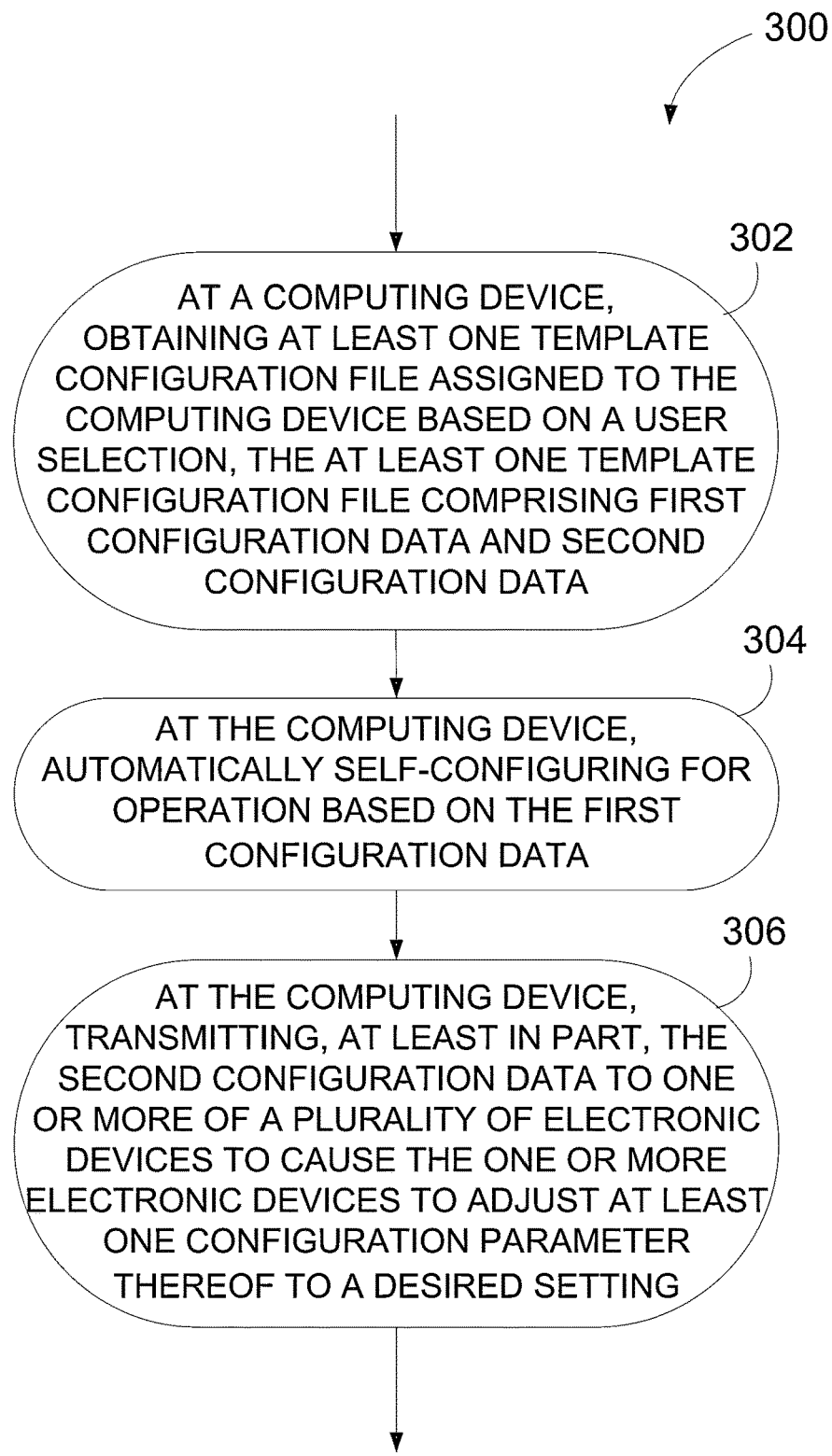
FIG. 3 is a flowchart illustrating an example method for device configuration performed at the computing device of FIG. 1A, in accordance with an illustrative embodiment.

Referring now to FIG. 3, a method 300 for device configuration performed at the computing device (reference 104 in FIG. 1A) will now be described, in accordance with one embodiment. The computing device is communicatively coupled to a plurality of electronic devices provided in a vehicle of a fleet. Step 302 comprises obtaining, at the computing device, at least one template configuration file assigned to the computing device based on a user selection. The at least one template configuration file is specific to the fleet of vehicles and comprises first configuration data indicative of a manner in which the computing device is to interface with the plurality of electronic devices and second configuration data indicative of a desired setting for at least one configuration parameter of one or more of the plurality of electronic devices, as described herein above. Step 304 comprises, at the computing device, automatically self-configuring for operation based on the first configuration data, in the manner described above with reference to FIG. 1A and FIG. 2. Step 306 comprises, at the computing device, transmitting, at least in part, the second configuration data to one or more of a plurality of electronic devices to cause the one or more electronic devices to adjust at least one configuration parameter thereof to a desired setting, in the manner described above with reference to FIG. 1A and FIG. 2.

In the method 300, the user selection is received at a server remote from the vehicle and communicatively coupled to the computing device. The at least one template configuration file is associated, at the server and based on the user selection, with an identifier of the computing device.

In the method 300, obtaining the at least one template configuration file comprises retrieving the at least one template configuration file from the server.

In the method 300, obtaining the at least one template configuration file comprises receiving the at least one template configuration file in response to a user-initiated command.

In the method 300, the obtaining the at least one template configuration file occurs in response to the computing device powering on and connecting to a cloud server remote from the vehicle.

In some examples, the method 300 further comprises periodically communicating with a server remote from the vehicle to monitor configuration changes for at least one of the computing device and the plurality of electronic devices. The obtaining the at least one template configuration file occurs subsequent to detecting the configuration changes.

In the method 300, the second configuration data is at least in part transmitted to the one or more electronic devices comprising one or more video cameras, the second configuration data at least in part transmitted to the one or more video cameras to cause the one or more video cameras to adjust the at least one configuration parameter comprising at least one of a frame rate, an image quality, an image resolution, at least one network setting, a location update frequency, and login credentials associated with the one or more video cameras.

In some examples, the method 300 further comprises receiving, subsequent to the self-configuring, device data from the plurality of electronic devices and temporarily storing, for a given period of time, the device data in a local storage media accessible to the computing device.

In the method 300, the first configuration data is further indicative of a manner in which the computing device is to interface with a server remote from the vehicle and communicatively coupled to the computing device.

In some examples, the method 300 further comprises uploading the device data to the server after the given period of time has elapsed.

In the method 300, the given period of time corresponds to a period of time during which a connection between the computing device and the server is lost. The device data is uploaded to the server after the connection is restored.

In the method 300, receiving the device data from the plurality of devices comprises receiving video data from a plurality of video cameras installed in the vehicle.

In the method 300, receiving the device data from the plurality of devices comprises receiving sensor data from a plurality of sensors installed in the vehicle.

In some examples, the method 300 further comprises deriving, from the second configuration data, different configurations for different ones of the plurality of electronic devices, and transmitting the different configurations to the different ones of the plurality of electronic devices.

In some examples, the method 300 further comprises receiving, subsequent to the self-configuring, device data from the plurality of electronic devices and transmitting the device data to a server remote from the vehicle and communicatively coupled to the computing device.

Figure 4:
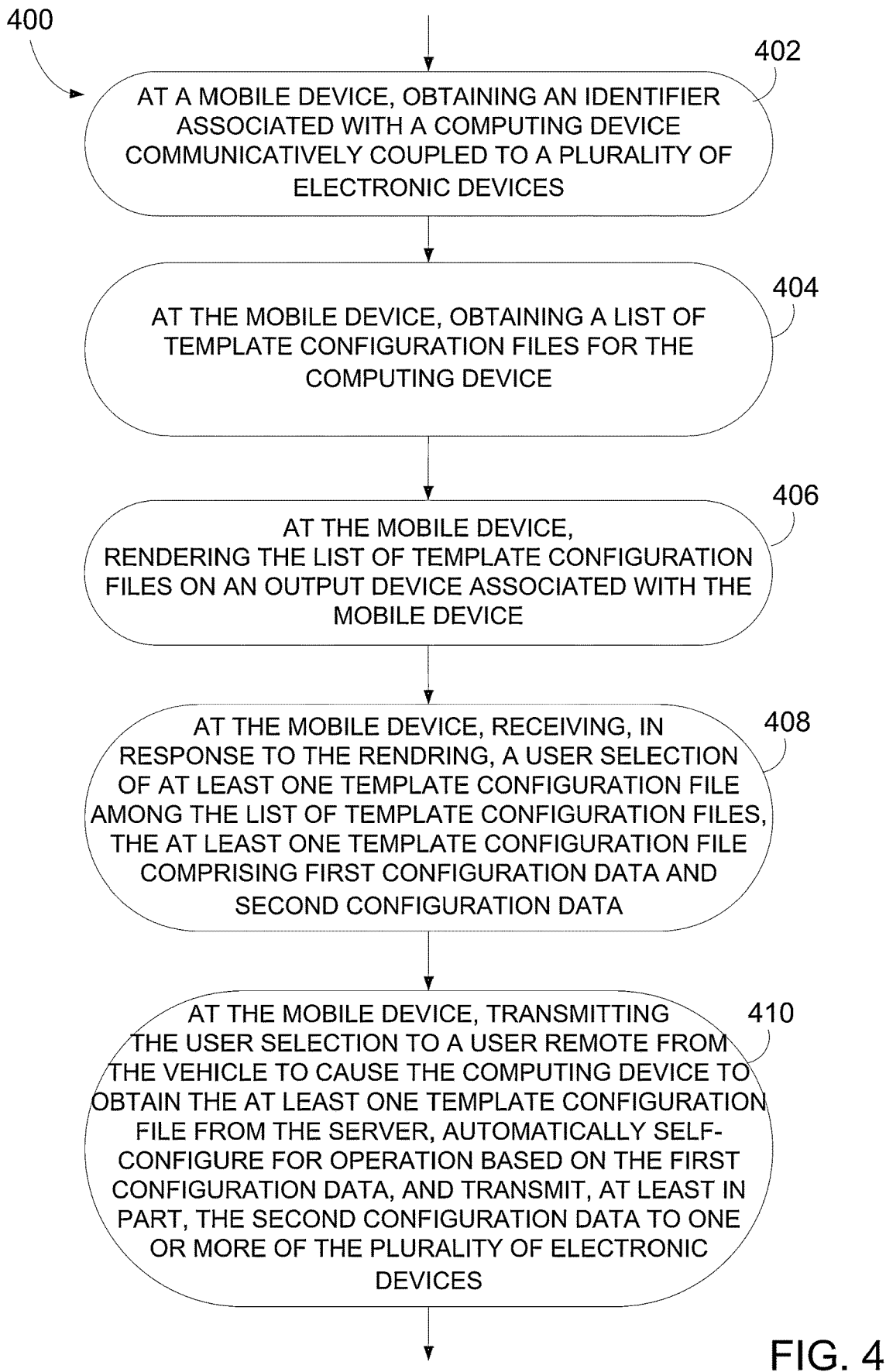
FIG. 4 is a flowchart illustrating an example method for device configuration performed at the computing device of FIG. 1A, in accordance with an illustrative embodiment.

Referring now to FIG. 4, a method 400 for device configuration performed at the mobile device (reference 110 in FIG. 1A) will now be described, in accordance with one embodiment. The mobile device is separate from the vehicle in the fleet. Step 402 comprises at the mobile device, obtaining an identifier associated with a computing device (e.g., computing device 104) communicatively coupled to a plurality of electronic devices (e.g., electronic devices 106) provided in the vehicle. The identifier may be obtained in the manner described above with reference to FIG. 1A and FIG. 2. Step 404 comprises, at the mobile device, obtaining a list of template configuration files for the computing device. The list of template configuration files may be associated with the identifier. In one embodiment, and as described herein above, the identifier is associated to the customer account and the customer account is associated with the list of template configuration files. Thus, in some embodiments, the association between the list of template configuration files and the identifier need not be a direct association.

Step 406 comprises, at the mobile device, rendering the list of template configuration files on an output device associated with the mobile device. Step 408 comprises, at the mobile device, receiving, in response to the rendering, a user selection of at least one template configuration file among the list of template configuration files. The at least one template configuration file is specific to the fleet of vehicles and comprises first configuration data and second configuration data, as described herein above. Step 410 comprises, at the mobile device, transmitting the user selection of the at least one template configuration file to a server (e.g., remote from the vehicle) to cause the computing device to obtain the at least one template configuration file from the server, automatically self-configure for operation based on the first configuration data, and transmit, at least in part, the second configuration data to one or more of the plurality of electronic devices to cause the one or more of the plurality of electronic devices to adjust the at least one configuration parameter to the desired setting, in the manner described herein above with reference to FIG. 1A and FIG. 2.

In the method 400, obtaining the identifier comprises reading computer-readable indicia associated with the computing device to acquire the identifier encoded in the computer-readable indicia.

In the method 400, reading the computer-readable indicia comprises scanning one of a barcode, a matrix code, and a quick response (QR) code.

In the method 400, reading the computer-readable indicia comprises reading a radio-frequency identifier (RFID) tag.

In the method 400, obtaining the identifier comprises receiving the identifier via at least one input device associated with the mobile device.

In some examples, the method 400 further comprises connecting to the computing device over a wireless communication link, the identifier obtained via the wireless communication link.

In some examples, the method 400 further comprises setting, via the wireless communication link, at least one initial configuration of the computing device.

In the method 400, the wireless communication link uses one of a Bluetooth communication protocol and a Near-field communication protocol.

In some examples, the method 400 further comprises transmitting the identifier to the server for enrolment of the computing device with a customer account. In the method 400, obtaining the list of template configuration files comprises receiving, from the server, the list of template configuration files associated with the customer account at the server.

In some examples, the method 400 further comprises authenticating the mobile device with the server and logging into the customer account prior to transmitting the identifier thereto.

Figure 5:
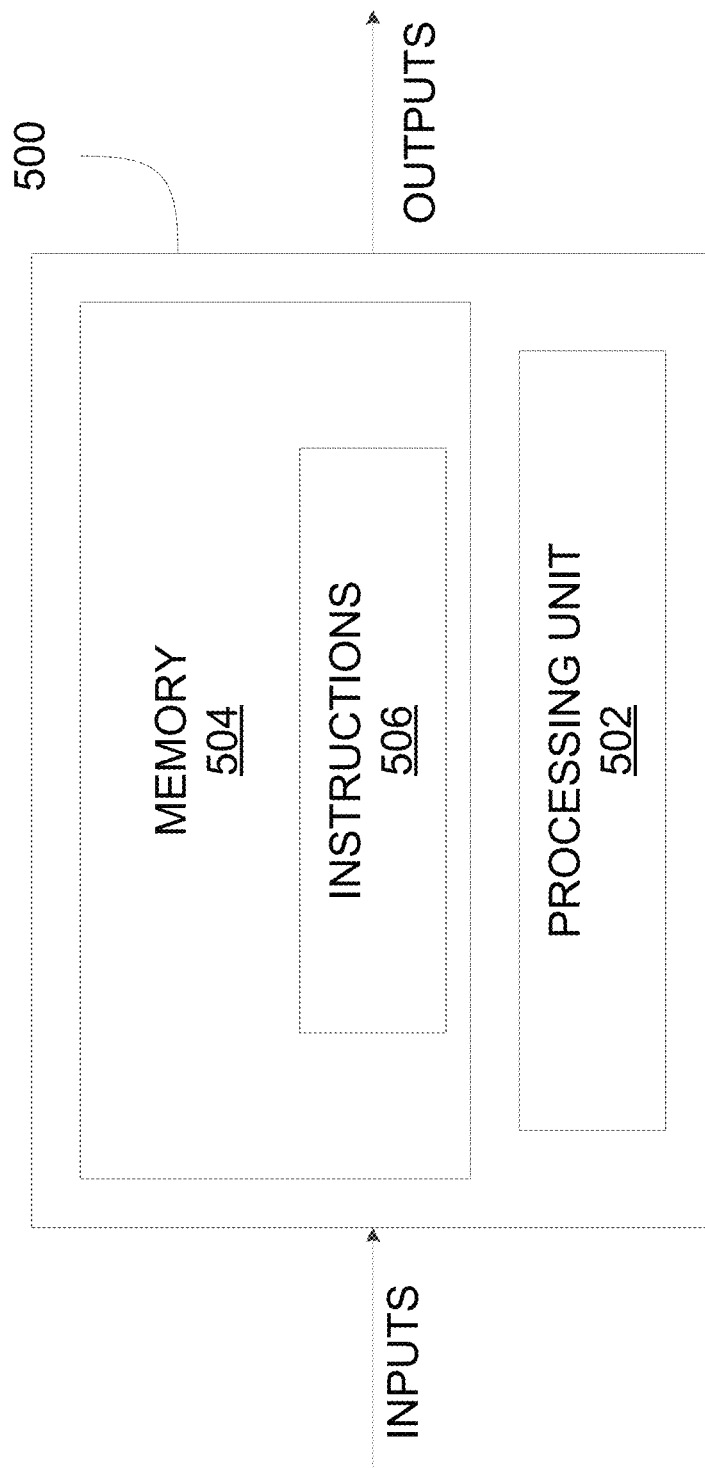
FIG. 5 is block diagram of an example computing device, in accordance with an illustrative embodiment.

FIG. 5 is a schematic diagram of computing device 500, which may be used to implement the method 300 of FIG. 3, the method 400 of FIG. 4, and/or one or more components of the system 100, 100', and 100" of FIGS. 1A, 1B, and 10. In certain embodiments, the computing device 500 is operable to register and authenticate users (using a login, unique identifier, and password for example) prior to providing access to applications, a local network, network resources, other networks or devices, and network security devices. The computing device 500 may serve one user or multiple users.

The computing device 500 comprises a processing unit 502 and a memory 504 which has stored therein computer-executable instructions 506. The processing unit 502 may comprise any suitable devices configured to implement the functionality of the method 300 and/or the method 400 such that instructions 506, when executed by the computing device 500 or other programmable apparatus, may cause the functions/acts/steps performed by method 300 and/or the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitable programmed or programmable logic circuits, custom-designed analog and/or digital circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g. devices) suitable for retrievably storing machine-readable instructions 506 executable by the processing unit 502.

In some embodiments, the systems and methods described herein may allow to minimize the on-board system configuration time, thus saving hours of work in the initial setup and maintenance phases of a project. For instance, once one vehicle in the fleet has been configured in a particular manner, the template confirmation file for that vehicle can be stored at the server and can be used to quickly configure other vehicles in the fleet as part of an enrollment and/or configuration process that requires little or no technical expertise and/or with only a few steps that take minimal time by the user (e.g., authenticating to a server with a mobile application, scanning a QR code on the edge device, and selecting the template configuration file from one in a list). Similar benefits apply to configuring devices in other environments, such as buildings, commercial spaces, retail branches, etc. Furthermore, when a change or update is made to the template configuration file this change or update can be uniformly applied to all devices in the fleet and/or environment which can result in homogeneous deployment and/or management of the devices.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

What is claimed is:

1. A device configuration method for a vehicle in a fleet of vehicles, the method comprising:
   at an edge computing device configured to connect a plurality of electronic devices with a server, the plurality of electronic devices provided in the vehicle at an edge of a network, and the server remote from the vehicle and communicatively coupled to the edge computing device,
      obtaining at least one template configuration file assigned to the edge computing device based on a user selection, the at least one template configuration file specific to the fleet of vehicles and comprising first configuration data and second configuration data, the first configuration data indicative of a manner in which the edge computing device is to interface with the plurality of electronic devices, and the second configuration data indicative of a desired setting for at least one configuration parameter of at least one of the plurality of electronic devices;
      automatically self-configuring for operation based on the first configuration data, comprising:
         identifying, based on the first configuration data, one or more electronic devices among the plurality of electronic devices; and
         connecting, based on the first configuration data, to the one or more electronic devices for transmitting thereto and receiving therefrom data; and
      transmitting the second configuration data to at least some of the one or more electronic devices to cause the at least some of the one or more electronic devices to adjust the at least one configuration parameter to the desired setting.

2. The method of claim 1, wherein the user selection is received at the server, further wherein the at least one template configuration file is associated, at the server and based on the user selection, with an identifier of the edge computing device.

3. The method of claim 2, wherein obtaining the at least one template configuration file comprises retrieving the at least one template configuration file from the server.

4. The method of claim 1, wherein obtaining the at least one template configuration file comprises receiving the at least one template configuration file in response to a user-initiated command.

5. The method of claim 1, wherein the server is a cloud server, further wherein the obtaining the at least one template configuration file occurs in response to the edge computing device powering on and connecting to the cloud server.

6. The method of claim 1, further comprising periodically communicating with the server to monitor configuration changes for at least one of the edge computing device and the plurality of electronic devices, wherein the obtaining the at least one template configuration file occurs subsequent to detecting the configuration changes.

7. The method of claim 1, wherein the second configuration data is transmitted to the at least some of the one or more electronic devices comprising one or more video cameras, the second configuration data transmitted to the one or more video cameras to cause the one or more video cameras to adjust the at least one configuration parameter comprising at least one of a frame rate, an image quality, an image resolution, at least one network setting, a location update frequency, and login credentials associated with the one or more video cameras.

8. The method of claim 1, further comprising receiving, subsequent to the self-configuring, device data from the at least some of the one or more electronic devices and temporarily storing, for a given period of time, the device data in a local storage media accessible to the edge computing device.

9. The method of claim 8, wherein the first configuration data is further indicative of a manner in which the edge computing device is to interface with the server.

10. The method of claim 9, further comprising uploading the device data to the server after the given period of time has elapsed.

11. The method of claim 10, wherein the given period of time corresponds to a period of time during which a connection between the edge computing device and the server is lost, further wherein the device data is uploaded to the server after the connection is restored.

12. The method of claim 8, wherein receiving the device data from the plurality of devices comprises receiving video data from a plurality of video cameras installed in the vehicle.

13. The method of claim 8, wherein receiving the device data from the at least some of the one or more devices comprises receiving sensor data from a plurality of sensors installed in the vehicle.

14. The method of claim 1, further comprising deriving, from the second configuration data, different configurations for different ones of the plurality of electronic devices, and transmitting the different configurations to the different ones of the plurality of electronic devices.

15. The method of claim 1, further comprising receiving, subsequent to the self-configuring, device data from the at least some of the one or more electronic devices and transmitting the device data to the server.

16. A device configuration method for a vehicle in a fleet of vehicles, the method comprising:
    at a mobile device separate from the vehicle,
       obtaining an identifier associated with an edge computing device configured to connect a plurality of electronic devices with a server, the plurality of electronic devices provided in the vehicle at an edge of a network, and the server remote from the vehicle and communicatively coupled to the edge computing device;

obtaining a list of template configuration files for the edge computing device;

rendering the list of template configuration files on an output device associated with the mobile device;

receiving, in response to the rendering, a user selection of at least one template configuration file among the list of template configuration files, the at least one template configuration file specific to the fleet of vehicles and comprising first configuration data and second configuration data, the first configuration data indicative of a manner in which the edge computing device is to interface with the plurality of electronic devices, and the second configuration data indicative of a desired setting for at least one configuration parameter of at least one of the plurality of electronic devices; and transmitting the user selection of the at least one template configuration file to the server to cause the edge computing device to:
  obtain the at least one template configuration file from the server,
  automatically self-configure for operation based on the first configuration data, comprising identifying, based on the first configuration data, one or more electronic devices among the plurality of electronic devices, and connecting, based on the first configuration data, to the one or more electronic devices for transmitting thereto and receiving therefrom data, and
  transmit the second configuration data to at least some of the one or more electronic devices to cause the at least some of the one or more of electronic devices to adjust the at least one configuration parameter to the desired setting.

17. The method of claim 16, wherein obtaining the identifier comprises reading computer-readable indicia associated with the edge computing device to acquire the identifier encoded in the computer-readable indicia.

18. The method of claim 17, wherein reading the computer-readable indicia comprises scanning one of a barcode, a matrix code, and a quick response (QR) code.

19. The method of claim 17, wherein reading the computer-readable indicia comprises reading a radio-frequency identifier (RFID) tag.

20. The method of claim 16, wherein obtaining the identifier comprises receiving the identifier via at least one input device associated with the mobile device.

21. The method of claim 16, further comprising connecting to the edge computing device over a wireless communication link, the identifier obtained via the wireless communication link.

22. The method of claim 21, further comprising setting, via the wireless communication link, at least one initial configuration of the edge computing device.

23. The method of claim 21, wherein the wireless communication link uses one of a Bluetooth communication protocol and a Near-field communication protocol.

24. The method of claim 16, further comprising transmitting the identifier to the server for enrolment of the edge computing device with a customer account, wherein obtaining the list of template configuration files comprises receiving, from the server, the list of template configuration files associated with the customer account at the server.

25. The method of claim 24, further comprising authenticating the mobile device with the server and logging into the customer account prior to transmitting the identifier thereto.

* * * * *